United States Patent
Hong et al.

(10) Patent No.: US 10,129,744 B2
(45) Date of Patent: Nov. 13, 2018

(54) MOBILE TERMINAL FOR TRANSMITTING WIFI HOTSPOT KEY OR CERTIFICATE BY USING NFC

(71) Applicant: BORQS WIRELESS LTD., Beijing (CN)

(72) Inventors: Mingsong Hong, Beijing (CN); Kaibing Chen, Beijing (CN)

(73) Assignee: BORQS WIRELESS LTD. (CN)

( * ) Notice: Subject to any disclaimer, the term of this patent is extended or adjusted under 35 U.S.C. 154(b) by 82 days.

(21) Appl. No.: 14/420,608

(22) PCT Filed: Nov. 2, 2012

(86) PCT No.: PCT/CN2012/083963
§ 371 (c)(1),
(2) Date: Feb. 9, 2015

(87) PCT Pub. No.: WO2014/026438
PCT Pub. Date: Feb. 20, 2014

(65) Prior Publication Data
US 2015/0223063 A1    Aug. 6, 2015

(30) Foreign Application Priority Data
Aug. 16, 2012 (CN) .................. 2012 2 0405086 U

(51) Int. Cl.
*H04W 12/06* (2009.01)
*H04W 12/04* (2009.01)
(Continued)

(52) U.S. Cl.
CPC .......... *H04W 12/06* (2013.01); *H04B 5/0031* (2013.01); *H04L 63/18* (2013.01);
(Continued)

(58) Field of Classification Search
CPC ..... H04W 12/00–12/12; H04W 12/06; H04W 4/008; H04W 12/04; H04W 8/18;
(Continued)

(56) References Cited

U.S. PATENT DOCUMENTS

2009/0178118 A1*  7/2009  Cedo Perpinya ....... H04L 63/08
                                                             726/3
2013/0080274 A1*  3/2013  Pochic ................. G06Q 20/409
                                                             705/16

(Continued)

FOREIGN PATENT DOCUMENTS

| CN | 101998695 | 3/2011 | ............... H04B 5/00 |
| CN | 201846482 | 5/2011 | ............... H04B 5/00 |
| CN | 102315864 | 1/2012 | ............... H04B 5/00 |

OTHER PUBLICATIONS

Provisional U.S. Appl. No. 61/676,207 for cited US 2014/0029512 A1, Chu et al.*

(Continued)

*Primary Examiner* — Ashokkumar B Patel
*Assistant Examiner* — Quazi Farooqui
(74) *Attorney, Agent, or Firm* — Hayes Soloway P.C.

(57) ABSTRACT

Disclosed is a mobile terminal for transmitting WIFI hotspot key or certificate by using NFC, the mobile terminal including a transmission control module, a NFC module, a WIFI module and a SIM card module. The transmission control module, which connects to the NFC module, the WIFI module and the SIM card module, controls the work of the NFC module and the WIFI module. The NFC module, which connects to the transmission control module and the WIFI module respectively, obtains the WIFI hotspot key or certificate. The WIFI Module, which connects to the transmission control module and the NFC module respectively, completes WIFI network connection. The SIM card module, which connects to the transmission control module, saves (Continued)

user information of the mobile terminal. The mobile terminal in present invention that transmits the key or certificate by using NFC ensures certainty and security of client, thus greatly simplifies the actions of user.

20 Claims, 1 Drawing Sheet

(51) Int. Cl.
    *H04W 8/18*     (2009.01)
    *H04B 5/00*     (2006.01)
    *H04L 29/06*     (2006.01)
    *H04W 4/80*     (2018.01)
    *H04W 84/12*     (2009.01)

(52) U.S. Cl.
    CPC ............... *H04W 4/80* (2018.02); *H04W 8/18* (2013.01); *H04W 12/04* (2013.01); *H04W 84/12* (2013.01)

(58) Field of Classification Search
    CPC ........ H04W 84/12; H04W 4/80; H04L 63/18; H04B 5/0031; H04B 5/00
    USPC ......... 726/9, 4, 5, 20, 27; 713/156, 175, 184
    See application file for complete search history.

(56) References Cited

U.S. PATENT DOCUMENTS

| 2014/0004793 | A1* | 1/2014 | Bandyopadhyay | H04L 63/0428 |
| | | | | 455/41.1 |
| 2014/0029512 | A1* | 1/2014 | Chu | H04L 63/0892 |
| | | | | 370/328 |
| 2015/0095493 | A1* | 4/2015 | Xu | H04B 3/542 |
| | | | | 709/225 |

OTHER PUBLICATIONS

NPL search in Google Scholar. (Year: 2009).*
International Search Report issued in corresponding application No. PCT/CN2012/083963, dated May 9, 2013 (4 pgs).

* cited by examiner

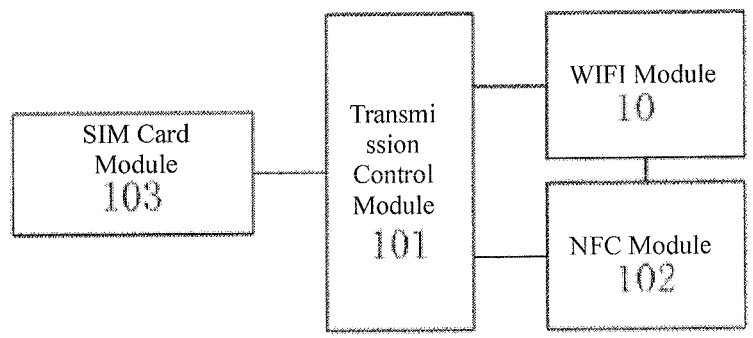

MOBILE TERMINAL FOR TRANSMITTING WIFI HOTSPOT KEY OR CERTIFICATE BY USING NFC

I. TECHNICAL FIELD

The present invention relates to a mobile terminal, in particular to a mobile terminal for transmitting WIFI hotspot key or certificate by using NFC.

II. BACKGROUND ART

NFC is an abbreviation of Near Field Communication, i.e., a short distance wireless communication technique, which enables different devices to communicate with each other easily, securely, quickly, and automatically. Compared with other connection modes in the wireless world, NFC is a short-distance private communication mode.

For WIFI technology, how to ensure the security of data transmission is very important. At present, the transmitted data is authenticated and encrypted by means of a key inputted by the user or a certificate.

Usually, WIFI hotspot uses a WPA/WPA2/WAPI security mode.

For personal mode, i.e., PSK (pre-shared key) mode, the user has to input WIFI hotspot key; for enterprise mode, i.e., certificate mode, the user usually has to download and install a certificate for connection to WIFI hotspot.

For PSK mode, to ease the setup work for the user, a WPS (Wi-Fi Protected Setup) protocol (PBC mode) is available presently for transmission of a key, so that the user doesn't have to input the key and can set up conveniently. However, since the key is transmitted via an air interface and the WIFI hotspot is open to all users within its effective range in a specific period after the button of WIFI hotspot is pressed, there is security and uncertainty risk (the user is uncertain).

For enterprise mode, the user has to download a certificate from network administrator or other entity and install the certificate in the system of his own device, the operation is troublesome.

III. CONTENT OF THE INVENTION

Technical Problem

To overcome the drawbacks in the prior art, the object of the present invention is to provide a mobile terminal for transmitting WIFI hotspot key or certificate by using NFC, which utilizes the NFC technique to transmit WIFI hotspot key or certificate, so as to greatly simplify the setup work of a user for connection to WIFI hotspot.

IV. SOLUTION TO THE PROBLEM

Technical Scheme

To attain the object described above, the present invention provides a mobile terminal for transmitting WIFI hotspot key or certificate by using NFC, comprising a transmission control module, a NFC module, a WIFI module, and a SIM card module, wherein, the transmission control module is connected to the NFC module, WIFI module, and SIM card module respectively, and is designed to control the operation of the NFC module and WIFI module;
the NFC module is connected to the transmission control module and WIFI module respectively, and is designed to obtain WIFI hotspot key or certificate;
the WIFI module is connected to the transmission control module and NFC module respectively, and is designed to establish a WIFI network connection;
the SIM card module is connected to the transmission control module, and is designed to store user information of the mobile terminal.

Wherein, the transmission control module is a microprocessor chip in the mobile terminal.

The mobile terminal for transmitting WWI hotspot key or certificate by using NFC provided in the present invention utilizes NFC to transmit WIFI hotspot key or certificate, and thereby ensures certainty and security of the client; for certificate transmission, NFC is used to transmit the certificate, and thereby the user's operation is greatly simplified.

Hereunder other characteristics and advantages of the present invention will be described in the specification, and will become apparent partially in the specification or can be understood clearly from the description of some embodiments.

V. BRIEF DESCRIPTION OF THE DRAWINGS

Description of the Drawings

The accompanying drawings are provided to help further understanding of the present invention, and constitute a part of the specification. These drawings are used in conjunction with the embodiments to interpret the present invention, but don't constitute any limitation to the present invention. Among the drawings:

FIG. 1 is a functional block diagram of a mobile terminal for transmitting WIFI hotspot key or certificate by using NFC according to the present invention.

VI. EMBODIMENTS

Detailed Description of the Embodiments

Hereunder some preferred embodiments of the present invention will be described, with reference to the accompanying drawings. It should be appreciated that the embodiments described here are only provided to describe and interpret the present invention, but don't constitute any limitation to the present invention.

FIG. 1 is a functional block diagram of a mobile terminal for transmitting WIFI hotspot or certificate by using NFC according to the present invention. As shown in FIG. 1, the mobile terminal for transmitting WIFI hotspot key or certificate by using NFC in the present invention comprises a transmission control module 101, a NFC module 102, a WIFI module 103, and a SIM card module 104, wherein,
the transmission control module 101 is connected to the NFC module 102, WIFI module 103, and SIM card module 104 respectively, and is designed to control the information transmission between the NFC module 102 and WIFI hotspot (not shown) and control the connection between the WIFI module 103 and WIFI network. Preferably, the transmission control module 101 is a microprocessor chip in the mobile terminal.

WIFI hotspot can be a mobile terminal with a built-in NFC module or can be composed of a separate WIFI hotspot device and a NFC device, so that it can be easily found by the user so as to realize data interaction with NFC.

The NFC module 102 is connected to the transmission control module 101 and WIFI module 103 respectively, accepts the control of the transmission control module 101, carries out data interaction with WIFI hotspot, and sends obtained WIFI hotspot key or certificate to the WIFI module 103.

The WIFI module 103 is connected to the transmission control module 101 and NFC module 102 respectively, accepts the control of the transmission control module 101, receives the WIFI hotspot key or certificate obtained by the NFC module 102, and establishes a WIFI network connection.

The SIM card module 104 is connected to the transmission control module 101, and is designed to store user information of the mobile terminal.

The mobile terminal for transmitting WIFI hotspot key or certificate by using NFC in the present invention operates as follows:

First, a user utilizes the mobile terminal provided in the present invention to search available WIFI hotspots, selects a desired one from the available WIFI hotspots for connection, and moves the mobile terminal to get close to the NFC part of the WIFI hotspot;

Then, the system in the user's mobile terminal initiates data interaction with NFC of the WIFI hotspot according to the security type of the WIFI hotspot selected by the user, e.g., PSK mode or certificate mode;

In PSK mode, the user's mobile terminal sends a request for obtaining PSK key to the WIFI hotspot. Depending on the actual application scenario, the WIFI hotspot can choose to require authentication or not; for example, some mobile terminals themselves have WIFI hotspot function, and in some cases that a temporary WLAN is to be set up or a Tether function is to be provided, authentication may be unnecessary, instead, the WIFI hotspot can transmits a PSK key directly to the user by means of NFC; in other cases e.g., in an enterprise, to ensure security, the WIFI hotspot may respond to the user's mobile terminal a message to request for authentication information, and the user's mobile terminal has to send its identity (e.g., the information in a built-in NFC security module or SIM card) to the WIFI hotspot; the WIFI hotspot searches the corresponding user information in a database according to the information provided by the user, and, if the authentication is successful, the WIFI hotspot will send a key to the user's mobile terminal by means of NFC; otherwise the WIFI hotspot will send a failure message;

In Certificate mode, the user's mobile terminal has to send a request for obtaining a certificate to the WIFI hotspot. Depending on the actual application scenario, there are two possible cases as described above: the WIFI hotspot may choose to require authentication or not. In case of temporary occasion or other occasions without the need of authentication, the WIFI hotspot will transmit a certificate to the user directly by means of NFC. If the WIFI hotspot require authentication, the WIFI hotspot will respond to the user's mobile terminal a message by means of NFC to request for authentication information, and the user's mobile terminal has to send its identity (e.g., the information in a built-in NFC security module or SIM card) to the WIFI hotspot; the WIFI hotspot searches for the corresponding certificate in a database according to the information provided by the user, and will transmit the certificate to the user's mobile terminal by means of NFC;

If a key or certificate is obtained successfully, the user's mobile terminal will set the obtained key or certificate into the WIFI module and the WIFI module will establish a WIFI network connection according to the key or certificate.

For the mobile terminal for transmitting WIFI hotspot key or certificate by using NFC in the present invention, in PSK mode, all users share the same key; in Certificate mode, usually a unique certificate has to be issued for each user, and each certificate has its expiry time, which is to say, different certificates have to be issued for different users.

For a temporary connection, e.g., for a customer visiting an enterprise, a temporary certificate is enough.

For a non-temporary certificate, e.g., for an employee in an enterprise, identity authentication can be realized with the information in a SIM card or NFC security module, and the corresponding certificate can be transmitted to the user's mobile terminal according to the identity information.

In PSK mode, security can also be ensured by means of authentication before transmission of a key.

Those skilled in the art should appreciate: the embodiments described above are only some preferred embodiments of the present invention, and should not be deemed as limitation to the present invention. Though the present invention is described and illustrated in detail with reference to the embodiments, those skilled in the art can easily make modifications to the technical scheme described above in the embodiments or make equivalent replacement for some technical features. For example, NFC can be replaced by BLUETOOTH to realize transmission of WIFI hotspot key or certificate. However, any modification, equivalent replacement, or refinement to the embodiments without departing from the spirit and principle of the present invention shall be deemed as falling into the protected domain of the present invention.

The invention claimed is:

1. A system for controlling a secured wireless communication connection between a mobile terminal device and a dedicated, non-mobile WIFI hotspot connected to a Near Field Communication—NFC device using transmission of a WIFI hotspot key or certificate in a certificate mode, the system comprising:
  a mobile terminal having a transmission control module, a NFC module, a WIFI module, and a SIM card, wherein,
  the transmission control module is connected to the NFC module, WIFI module, and SIM card respectively, wherein the transmission control module controls an operation of NFC module and WIFI module;
  the NFC module is connected to the transmission control module and WIFI module respectively, wherein during an initial connection of the mobile terminal to the dedicated, non-mobile WIFI hotspot, and when the mobile terminal is within a connection range of the NFC device of the dedicated, non-mobile WIFT hotspot, the NFC module connects directly to the NFC device of the dedicated, non-mobile WIFI hotspot, wherein the WIFI hotspot key or certificate for connecting to the dedicated, non-mobile WIFI hotspot is obtained from the NFC device of the dedicated, non-mobile WIFI hotspot using the NFC module, and wherein in the certificate mode, a temporary certificate is issued for connection of a temporary user and a non-temporary certificate is issued for connection of a non-temporary user and identity authentication of the non-temporary user is realized using the user information in the SIM card of the non-temporary user;
  the WIFI module is connected to the transmission control module and NFC module respectively, wherein the WIFI module establishes a WIFI network connection to the dedicated, non-mobile WIFI hotspot after obtaining the WIFI hotspot key or certificate from the NFC module, wherein when the mobile terminal is positioned beyond the connection range of the NFC device of the dedicated, non-mobile WIFI hotspot, the NFC module disconnects from the NFC device of the dedicated, non-mobile WIFI hotspot while the WIFI module remains connected to the dedicated, non-mobile WIFI hotspot; and the SIM card is connected to the transmission control module, wherein the SIM card stores user information of the mobile terminal.

2. The system according to claim 1, wherein, the transmission control module is a microprocessor chip in the mobile terminal.

3. The system of claim 1, wherein the NFC module connects to the WIFI hotspot to obtain the WIFI hotspot key or certificate using the NFC module prior to the WIFI module establishing the WIFI network connection.

4. The system of claim 1, wherein the NFC module connects to the WIFI hotspot when the mobile terminal is moved within a range of an NFC part of the WIFI hotspot.

5. The system of claim 1, wherein the mobile terminal searches for at least one available WIFI hotspot prior to the NFC module connecting to the WIFI hotspot.

6. The system of claim 5, wherein after the mobile terminal searches for the at least one available WWI hotspot and before the NFC module connects to the WIFI hotspot, the WIFI hotspot is selected from the at least one available WIFI hotspot by a user of the mobile terminal.

7. The system of claim 1, wherein the WIFI hotspot key or certificate is obtained using the NFC module in a Certificate mode.

8. The system of claim 7, wherein in Certificate mode, the certificate is transmitted to the NFC module of the mobile terminal.

9. The system of claim 8, wherein the certificate is transmitted to the NFC module of the mobile terminal after identity authentication realization using the user information in the SIM card.

10. The system of claim 1, wherein the WIFI hotspot key or certificate is obtained using the NFC module in a PSK mode.

11. The system of claim 10, wherein the mobile terminal is authenticated using at least one of a temporary WLAN and a tether function between the mobile terminal and the WIFI hotspot.

12. A method of controlling a secured wireless communication connection between a mobile terminal device and a dedicated, non-mobile WIFI hotspot connected to a Near Field Communication—NFC device by transmitting at least one of a WIFI hotspot key and a certificate in a certificate mode, the method comprising:

providing a mobile terminal having a transmission control module, a NFC module, a WIFI module, and a SIM card;

controlling an operation of the NFC module and the WIFI module with the transmission control module;

during an initial connection of the mobile temlinal to the dedicated, non-mobile WIFI hotspot, moving the mobile terminal within a connection range of the NFC device of the dedicated, non-mobile WIFI hotspot and connecting the NFC module directly to the NFC device of the dedicated, non-mobile WIFI hotspot;

obtaining at least one of the WIFI hotspot key and certificate, for connecting to the dedicated, non-mobile WIFI hotspot, directly from the NFC device of the dedicated, non-mobile WIFI hotspot using the NFC module, wherein in the certificate mode, a temporary certificate is issued for connection of a temporary user, and a non-temporary certificate is issued for connection of a non-temporary user and identity authentication of the non-temporary user is realized using the user information in the SIM card of the non-temporary user;

after obtaining the at least one of the WIFI hotspot key and certificate from the NFC module, establishing, with the WIFI module, a WIFI network connection between the WIFI module and the dedicated, non-mobile WIFI hotspot, wherein when the mobile terminal is positioned beyond the connection range of the NFC device of the dedicated, non-mobile WIFI hotspot, the NFC module disconnects from the NFC device of the dedicated, non-mobile WIFI hotspot while the WIFI module remains connected to the dedicated, non-mobile WIFI hotspot;

and storing user information of the mobile terminal on the SIM card.

13. The method of claim 12, wherein the NFC module connects to the WIFI hotspot to obtain the at least one of the WIFI hotspot key and certificate using the NFC module prior to the WIFI module establishing the WIFI network connection.

14. The method of claim 12, wherein the NFC module connects to the WIFI hotspot when the mobile terminal is moved within a range of an NFC part of the WIFI hotspot.

15. The method of claim 12, wherein the mobile terminal searches for at least one available WIFI hotspot prior to the NFC module connecting to the WIFI hotspot.

16. The method of claim 15, wherein after the mobile terminal searches for the at least one available WIFI hotspot and before the NFC module connects to the WIFI hotspot, the WIFI hotspot is selected from the at least one available WIFI hotspot by a user of the mobile terminal.

17. The method of claim 12, wherein the at least one of the WIFI hotspot key and certificate is obtained using the NFC module in a Certificate mode, where the certificate is transmitted to the NFC module of the mobile terminal.

18. The method of claim 17, wherein the certificate is transmitted to the NFC module of the mobile terminal after identity authentication realization using the user information in the SIM card.

19. The method of claim 12, wherein the at least one of the WIFI hotspot key and certificate is obtained using the NFC module in a PSK mode.

20. The method of claim 19, wherein the mobile terminal is authenticated using at least one of a temporary WLAN and a tether function between the mobile terminal and the WIFI hotspot.

* * * * *

UNITED STATES PATENT AND TRADEMARK OFFICE
CERTIFICATE OF CORRECTION

PATENT NO. : 10,129,744 B2
APPLICATION NO. : 14/420608
DATED : November 13, 2018
INVENTOR(S) : Hong et al.

Page 1 of 1

It is certified that error appears in the above-identified patent and that said Letters Patent is hereby corrected as shown below:

In the Claims

Claim 6, Column 5, Line 22, "WWI" should be --WIFI--.

Claim 12, Column 5, Line 54, "temlinal" should be --terminal--.

Signed and Sealed this
Thirtieth Day of April, 2019

Andrei Iancu
*Director of the United States Patent and Trademark Office*